United States Patent
Shibata et al.

(10) Patent No.: US 12,010,087 B2
(45) Date of Patent: Jun. 11, 2024

(54) COMMUNICATION DEVICE, ADDRESS LEARNING METHOD, AND PROGRAM

(71) Applicant: NIPPON TELEGRAPH AND TELEPHONE CORPORATION, Tokyo (JP)

(72) Inventors: Nobuhiro Shibata, Musashino (JP); Hideo Kawata, Musashino (JP); Shinichi Yoshihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/013,444

(22) PCT Filed: Jul. 3, 2020

(86) PCT No.: PCT/JP2020/026250
§ 371 (c)(1),
(2) Date: Dec. 28, 2022

(87) PCT Pub. No.: WO2022/003968
PCT Pub. Date: Jan. 6, 2022

(65) Prior Publication Data
US 2023/0300103 A1 Sep. 21, 2023

(51) Int. Cl.
*H04L 61/09* (2022.01)
*H04L 12/46* (2006.01)
*H04L 101/622* (2022.01)

(52) U.S. Cl.
CPC .......... *H04L 61/09* (2022.05); *H04L 12/4641* (2013.01); *H04L 2101/622* (2022.05)

(58) Field of Classification Search
CPC .......... H04L 61/09; H04L 12/4641; H04L 2101/622
(Continued)

(56) References Cited

U.S. PATENT DOCUMENTS

| 2004/0120269 A1 | 6/2004 | Sumino et al. |
| 2013/0003748 A1* | 1/2013 | Enoki .................... H04L 47/827 370/401 |

(Continued)

FOREIGN PATENT DOCUMENTS

| JP | 2004194145 A | 7/2004 |
| JP | 2012235400 A | 11/2012 |

(Continued)

OTHER PUBLICATIONS

LAN/MAN Standards Committee of the IEEE Computer Society, IEEE Standard for Local and Metropolitan Area Networks-Bridges and Bridged Networks, IEEE Std 802.1Q™-2018, Jul. 6, 2018.

*Primary Examiner* — Lan Dai T Truong
(74) *Attorney, Agent, or Firm* — Harness, Dickey & Pierce, P.L.C.

(57) ABSTRACT

An object of the present disclosure is to reduce band compression even in a case where a frame addressed to an original (overwritten) MAC is received again after a MAC address is overwritten.

A communication device according to the present disclosure measures a traffic amount in any predetermined determination data unit, holds MAC entry information including the measured traffic amount and a MAC address in a MAC learning data holding unit, at the time when the number of pieces of MAC entry information held by the MAC learning data holding unit reaches an upper limit, searches for minimum MAC entry information with a minimum traffic amount from among traffic data amounts in determination data unit held by the MAC learning data holding unit, and overwrites the minimum MAC entry information obtained by search with unlearned MAC entry information that is not held by the MAC learning data holding unit.

11 Claims, 21 Drawing Sheets

(58) Field of Classification Search
USPC .......................................................... 709/227
See application file for complete search history.

(56) References Cited

U.S. PATENT DOCUMENTS

| | | |
|---|---|---|
| 2014/0086250 A1 | 3/2014 | Mitsumori |
| 2018/0091423 A1 | 3/2018 | Hirota |
| 2020/0076644 A1 | 3/2020 | Kaku et al. |

FOREIGN PATENT DOCUMENTS

| | | |
|---|---|---|
| JP | 201472581 A | 4/2014 |
| JP | 201856739 A | 4/2018 |
| JP | 202036161 A | 3/2020 |

* cited by examiner

COMMUNICATION DEVICE, ADDRESS LEARNING METHOD, AND PROGRAM

CROSS-REFERENCE TO RELATED APPLICATIONS

This application is a 371 U.S. National Phase of International Application No. PCT/JP2020/026250, filed on Jul. 3, 2020. The entire disclosure of the above application is incorporated herein by reference.

TECHNICAL FIELD

The present disclosure relates to MAC address learning of an L2 device in a network.

BACKGROUND ART

In a network including a layer 2 (L2) device, a Unicast frame is transferred according to learning information of a media access control address (MAC address) of the L2 device. There is a method for overwriting and learning a learned MAC address in a case where the number of learned MAC addresses reaches the maximum learned number for each device or virtual LAN (VLAN) and a Unicast frame including an unlearned transmission source MAC address is received in a forwarding database (FDB) is received. However, in a case where the device receives a frame addressed to the overwritten MAC address again, as in FIG. 21, there is a possibility that a frame is transferred (flooding) to all ports (excluding reception port) of the VLAN and band compression is caused.

An object of the present disclosure is to reduce band compression caused by flooding even in a case where a frame addressed to an original (overwritten) MAC is received again after a learned MAC address is overwritten.

CITATION LIST

Non Patent Literature

Non Patent Literature 1: IEEE 802.1Q-2018 (IEEE Standard for Local and Metropolitan Area Networks-Bridges and Bridged Networks)

SUMMARY OF INVENTION

Technical Problem

An object of the present disclosure is to reduce band compression even in a case where a frame addressed to an original (overwritten) MAC is received again after a MAC address is overwritten.

Solution to Problem

A communication device according to the present disclosure
- measures a traffic amount in any predetermined determination data unit,
- holds MAC entry information including the measured traffic amount and a MAC address in a MAC learning data holding unit,
- at the time when the number of pieces of MAC entry information held by the MAC learning data holding unit reaches an upper limit,
- searches for minimum MAC entry information with a minimum traffic amount from among traffic data amounts in determination data unit held by the MAC learning data holding unit, and
- overwrites the minimum MAC entry information obtained by search with unlearned MAC entry information that is not held by the MAC learning data holding unit.

An address learning method according to the present disclosure is
an address learning method performed by a communication device, including:
- measuring a traffic amount in any predetermined determination data unit;
- holding MAC entry information including the measured traffic amount and a MAC address in a MAC learning data holding unit;
- at the time when the number of pieces of MAC entry information held by the MAC learning data holding unit reaches an upper limit,
- searching for minimum MAC entry information with a minimum traffic amount from among traffic data amounts in determination data unit held by the MAC learning data holding unit; and
- overwriting the minimum MAC entry information obtained by search with unlearned MAC entry information that is not held by the MAC learning data holding unit.

A program according to the present disclosure is a program for implementing a computer as each functional unit included in a communication device according to the present disclosure, and is a program for causing a computer to execute each step included in a communication method performed by the communication device according to the present disclosure.

Advantageous Effects of Invention

According to the present disclosure, even if the frame addressed to the original (overwritten) MAC is received again after the MAC address is overwritten, the traffic amount to be flooded is small, and accordingly, it is possible to reduce band compression.

DESCRIPTION OF EMBODIMENTS

Figure 1:
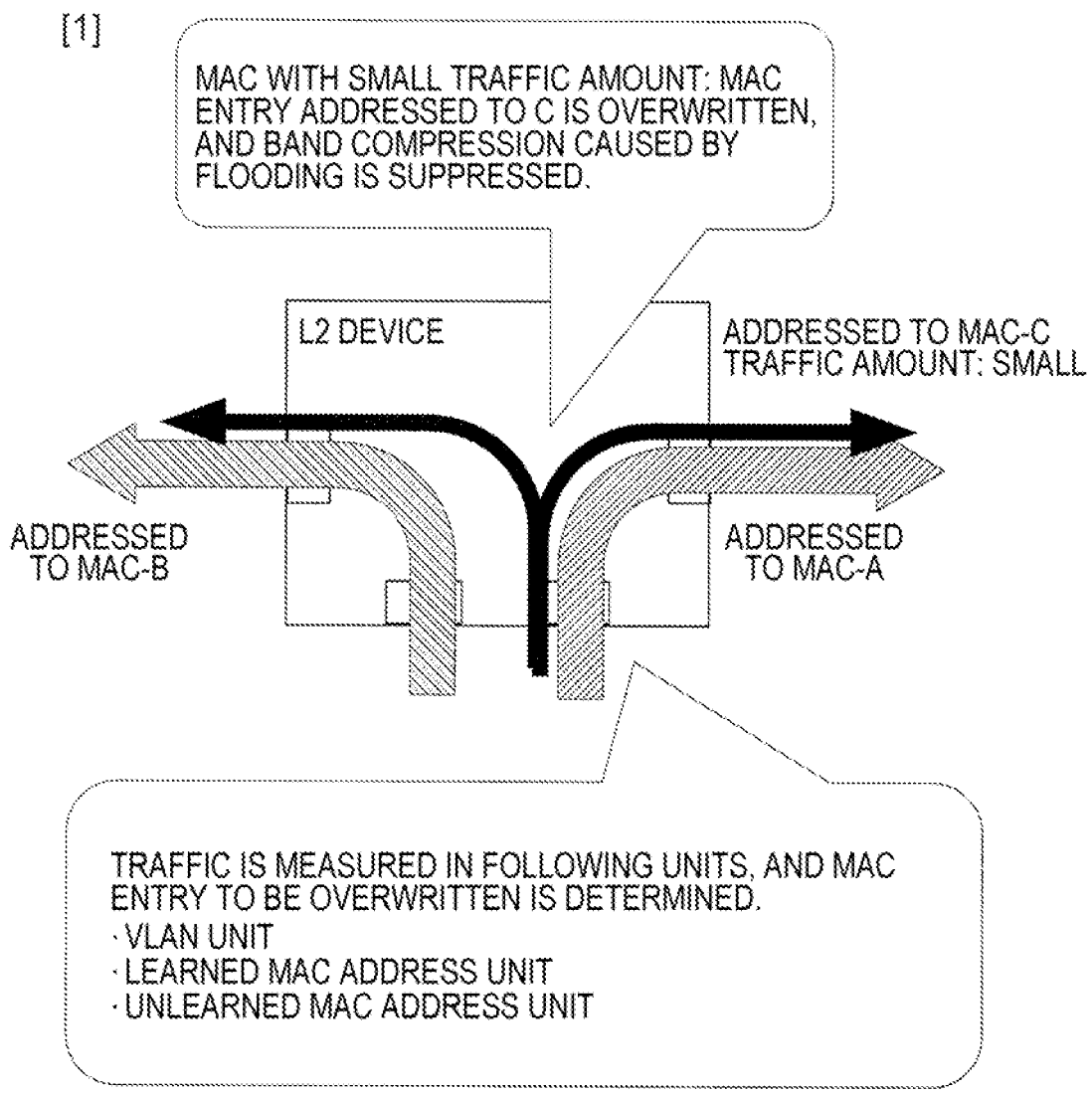
FIG. 1 illustrates an example of an L2 device according to the present disclosure.

Next, embodiments of the present disclosure will be described in detail with reference to the drawings. Note that the present disclosure is not limited to the following embodiments. These embodiments are merely examples, and the present disclosure can be implemented in a form to which various changes and modifications are applied on the basis of knowledge of those skilled in the art. Note that it is assumed that components having the same reference numeral in the specification and the drawings indicate the same component.

SUMMARY OF INVENTION

FIG. 1 illustrates an example of an L2 device according to the present disclosure. In the present invention, when the number of learned MACs for each device or VLAN in the L2 device reaches the maximum learned number, band compression caused by flooding is suppressed by overwriting MAC learning in consideration of a traffic amount. In the present invention, a learned MAC entry to be overwritten is determined on the basis of the traffic amounts measured in various units (VLAN unit, MAC learned MAC address unit, unlearned MAC address unit). According to the present invention, it is possible to suppress band compression caused by flooding when MAC learning is overwritten.

First Embodiment

Figure 2:
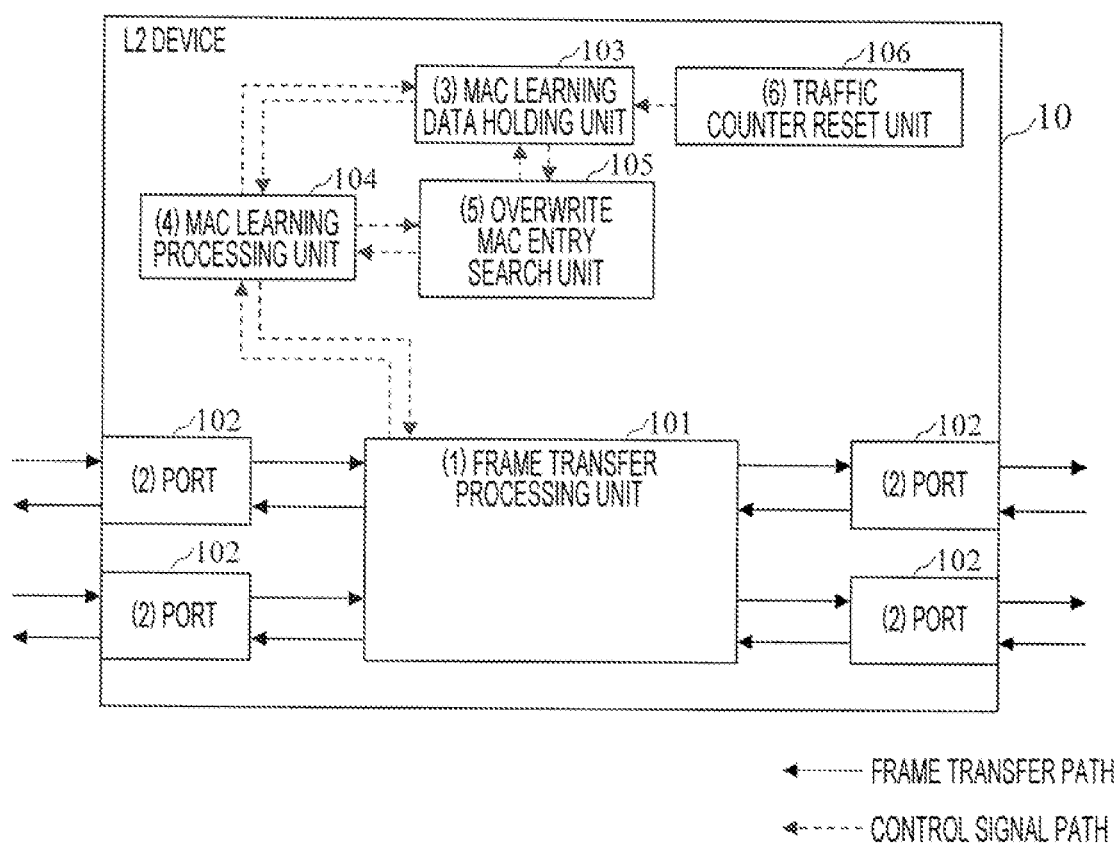
FIG. 2 illustrates a configuration example of an L2 device according to a first embodiment.

FIG. 2 illustrates a configuration example of an L2 device according to the present embodiment. An L2 device 10 according to the present embodiment includes a frame transfer processing unit 101, a port 102, a MAC learning data holding unit 103, a MAC learning processing unit 104, an overwrite MAC entry search unit 105, and a traffic counter reset unit 106.

The frame transfer processing unit 101 executes processing for transferring a received frame.

The port 102 receives a frame from an adjacent L2 device, transmits the frame to the frame transfer processing unit 101, and transfers the frame received from the frame transfer processing unit 101 to the adjacent L2 device.

The MAC learning data holding unit 103 holds MAC entry information including a MAC address, a VLAN, a connection destination port, and a traffic counter. Furthermore, the MAC learning data holding unit 103 includes the traffic counter for each MAC address and measures a traffic amount.

The MAC learning processing unit 104 searches the MAC learning data holding unit 103 for a transmission source MAC address and information regarding the VLAN of the frame received by the frame transfer processing unit 101. In a case where there is no MAC entry information and the number of pieces of MAC entry information held by the MAC learning data holding unit 103 does not reach the maximum number that is an upper limit, the MAC learning processing unit 104 writes data of the MAC entry information such as the MAC address or the VLAN of the received frame, or the connection destination port into a free space of the MAC learning data holding unit 103. Furthermore, in a case where there is no MAC entry information and the number of pieces of MAC entry information held by the MAC learning data holding unit 103 reaches the maximum number, the MAC learning processing unit 104 makes an inquiry to the overwrite MAC entry search unit 105, and overwrites the MAC entry information on MAC entry information specified by the overwrite MAC entry search unit 105.

Moreover, the MAC learning processing unit 104 searches for the MAC entry information of the MAC learning data holding unit 103 on the basis of the transmission destination MAC address and the information regarding the VLAN of the frame received by the frame transfer processing unit 101, adds a data length of the frame to the traffic counter of the MAC entry information at that time, and returns information regarding the connection destination port to the frame transfer processing unit 101.

In response to the inquiry from the MAC learning processing unit 104, the overwrite MAC entry search unit 105 searches the MAC entry information of the MAC learning data holding unit 103 for a MAC entry with a minimum traffic amount (may be referred to as minimum MAC entry in the present disclosure) and returns the MAC entry information to the MAC learning processing unit 104.

The traffic counter reset unit 106 resets a value of the traffic counter of the MAC learning data holding unit 103 at any interval set to the L2 device 10 in advance.

Figure 3:
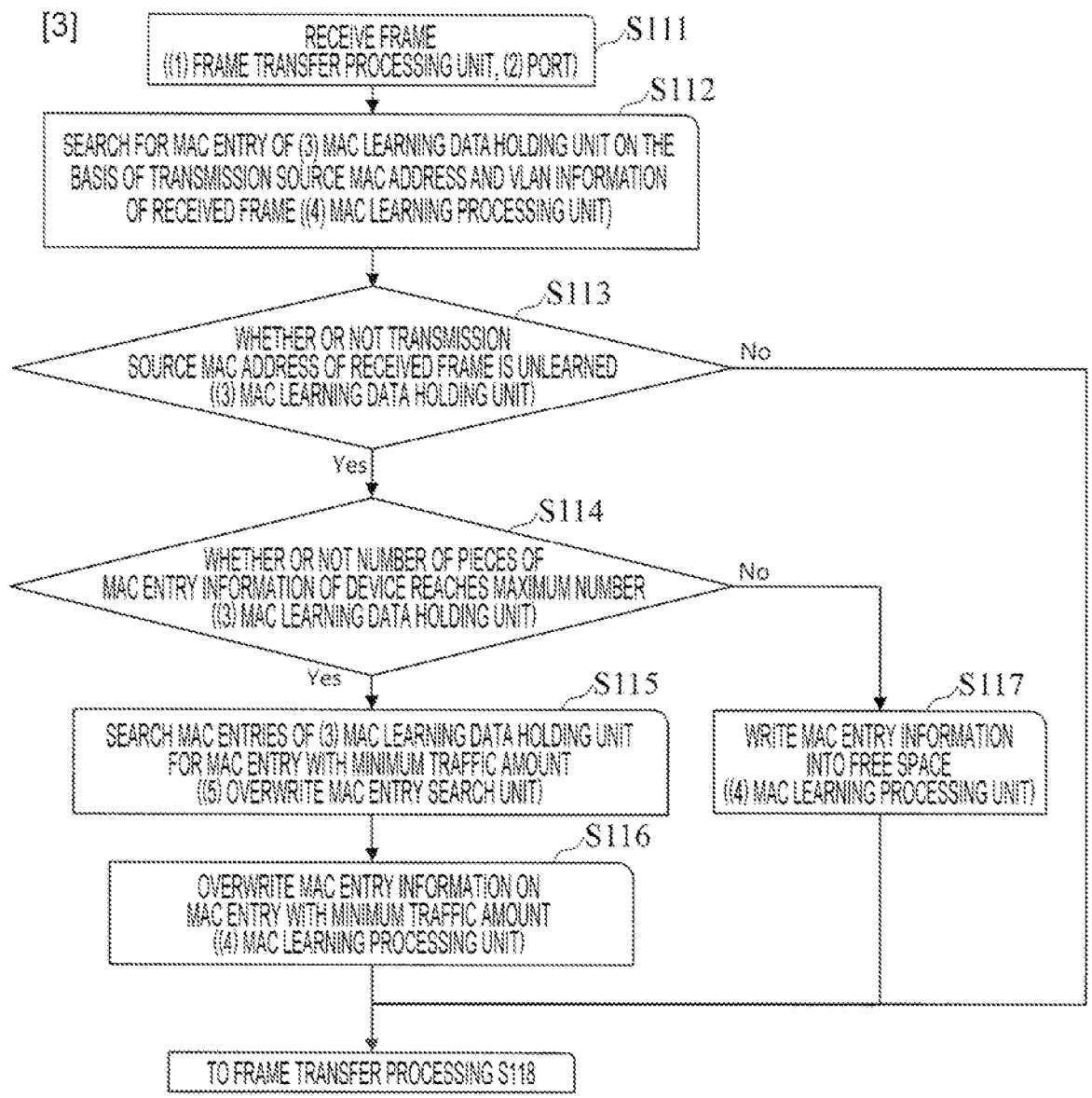
FIG. 3 illustrates an example of frame transfer processing according to the first embodiment.
Figure 4:
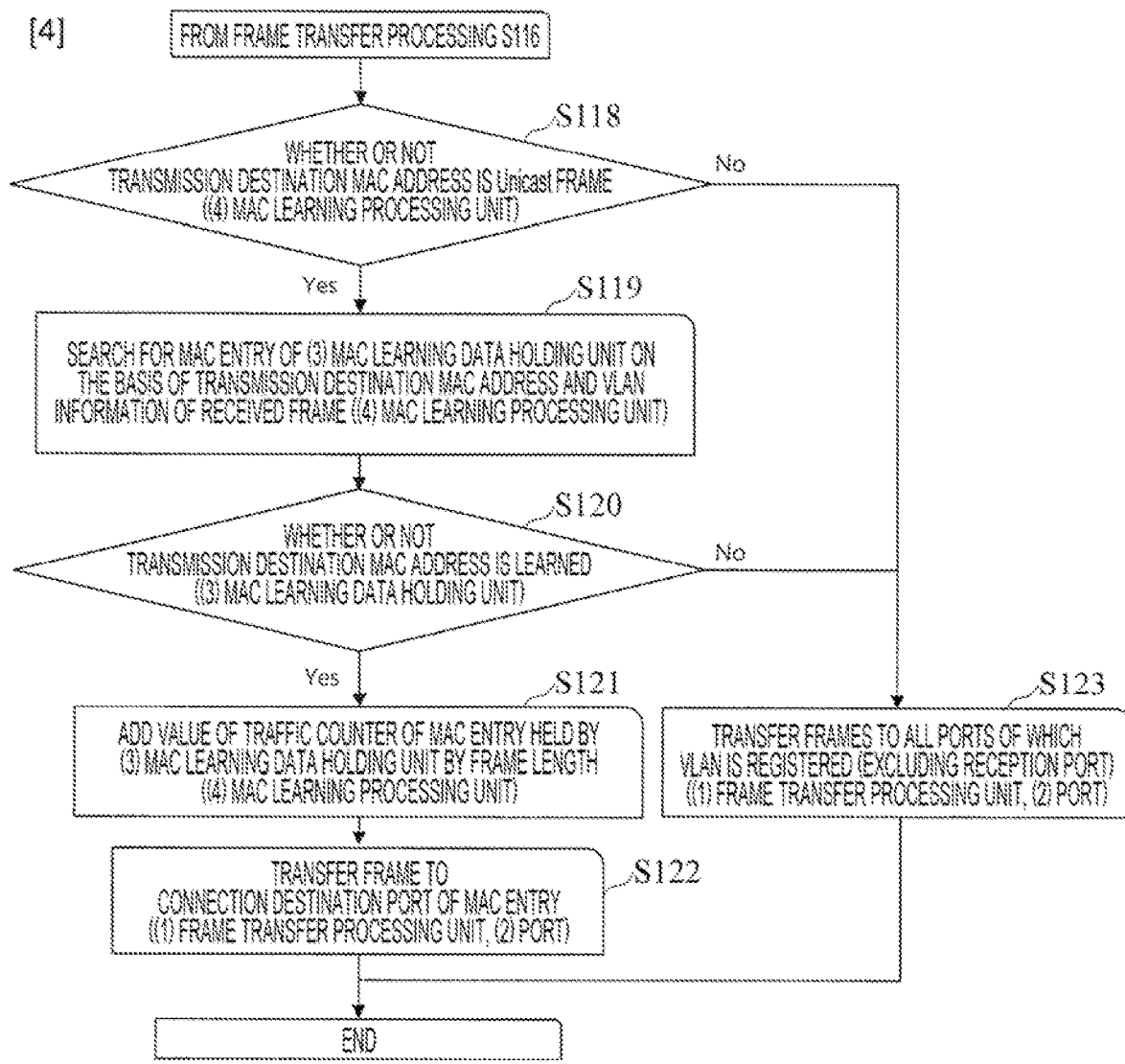
FIG. 4 illustrates an example of the frame transfer processing according to the first embodiment.

FIGS. 3 and 4 illustrate an example of frame transfer processing.

When receiving a frame (S111), the MAC learning processing unit 104 searches for a MAC entry of the MAC learning data holding unit 103 on the basis of the transmission source MAC address and the VLAN information of the received frame (S112). The MAC learning data holding unit 103 determines whether or not the transmission source MAC address of the received frame is held (S113). In a case where the transmission source MAC address of the received frame is not held and unlearned (Yes in S113), the MAC learning data holding unit 103 determines whether or not the number of pieces of MAC entry information of the device reaches the maximum number (S114).

In a case where the transmission source MAC address of the received frame is not held in the MAC learning data holding unit 103 and is unlearned (Yes in S113), and the number of pieces of MAC entry information of the device reaches the maximum number (Yes in S114), the overwrite MAC entry search unit 105 searches the MAC entries of the MAC learning data holding unit 103 for a MAC entry with the minimum traffic amount (S115). The MAC learning processing unit 104 overwrites the MAC entry information on the MAC entry with the minimum traffic amount among the learned MAC entries (S116). Specifically, the MAC entry with the minimum traffic amount is deleted, the transmission source MAC address of the received frame is written in a MAC address field, and the VLAN information is written in a VLAN field. In a case where there is a plurality of MAC entries with the minimum traffic amount, any one MAC entry is overwritten.

In a case where the transmission source MAC address of the received frame is not held in the MAC learning data holding unit 103 and is unlearned (Yes in S113) and the number of pieces of MAC entry information of the device does not reach the maximum number (No in S114), the MAC learning processing unit 104 writes the MAC entry information into a free space (S117).

When the transmission source MAC address of the received frame is learned (No in S113) or after steps S116 and S117, the MAC learning processing unit 104 determines whether or not a transmission destination MAC address is a Unicast frame (S118). In a case where the transmission destination MAC address is the Unicast frame, the MAC learning processing unit 104 searches for the MAC entry of the MAC learning data holding unit 103 on the basis of the transmission destination MAC address and the VLAN information of the received frame (S119).

The MAC learning data holding unit 103 determines whether or not the transmission destination MAC address is learned (S120). In a case where the transmission destination MAC address of the received frame is the Unicast frame and MAC learning has been performed, the MAC learning processing unit 104 adds a value of the traffic counter of the MAC entry by a frame length (S121). As a result, a traffic amount of the MAC entry information that matches the transmission destination MAC address of the received frame is updated. Note that a method for measuring the traffic amount of the received frame is not limited to the addition of the frame length using the traffic counter, and any method can be used. The frame transfer processing unit 101 and the port 102 transfer the frame to the connection destination port of the MAC entry (S122).

In a case where the transmission destination MAC address is not the Unicast frame (No in S118) or the transmission destination MAC address is unlearned in step S120 (No in S120), the frame transfer processing unit 101 and the port 102 transfer the frames to all ports of which the VLAN is registered (excluding reception port) (S123).

Figure 5:
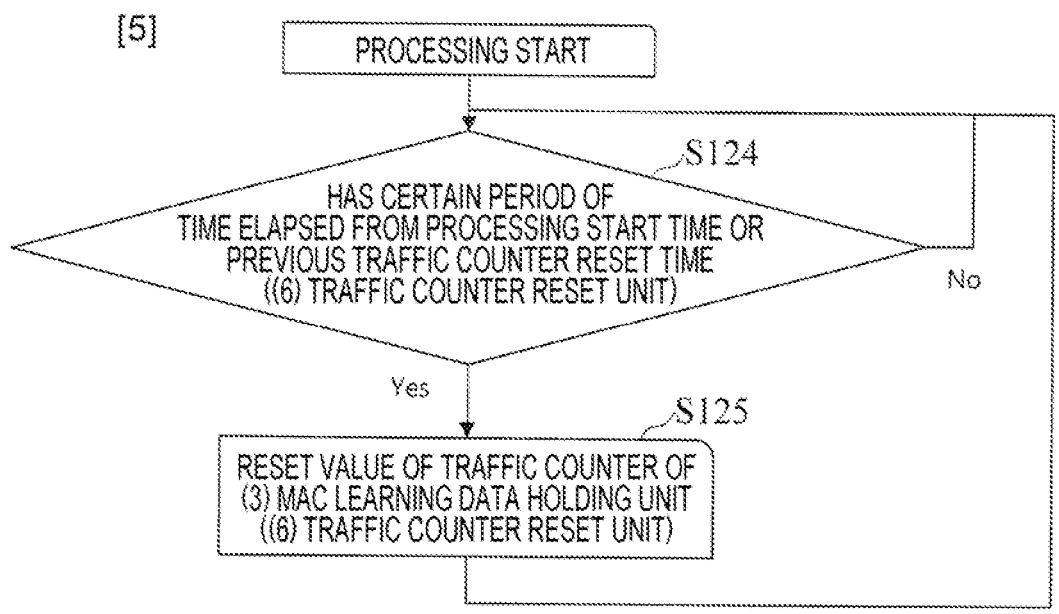
FIG. 5 illustrates an example of reset processing of a traffic counter according to the first embodiment.

FIG. 5 illustrates an example of reset processing of the traffic counter. In a case where a certain period of time has elapsed from a start time of the traffic counter reset processing or a previous traffic counter reset time (Yes in S124), the value of the traffic counter of the MAC entry information is reset (S125). As a result, the value of the traffic counter of the MAC entry represents a traffic amount flowed in a preset certain period of time.

In the present embodiment, by overwriting the MAC entry information with the minimum traffic amount (S116), it is possible to reduce an effect on a band caused by flooding of a frame addressed to the overwritten MAC address. Therefore, in the present embodiment, even if the frame addressed to the original (overwritten) MAC is received again after the MAC address is overwritten, the traffic amount to be flooded is small, and accordingly, it is possible to reduce band compression.

Second Embodiment

Figure 6:
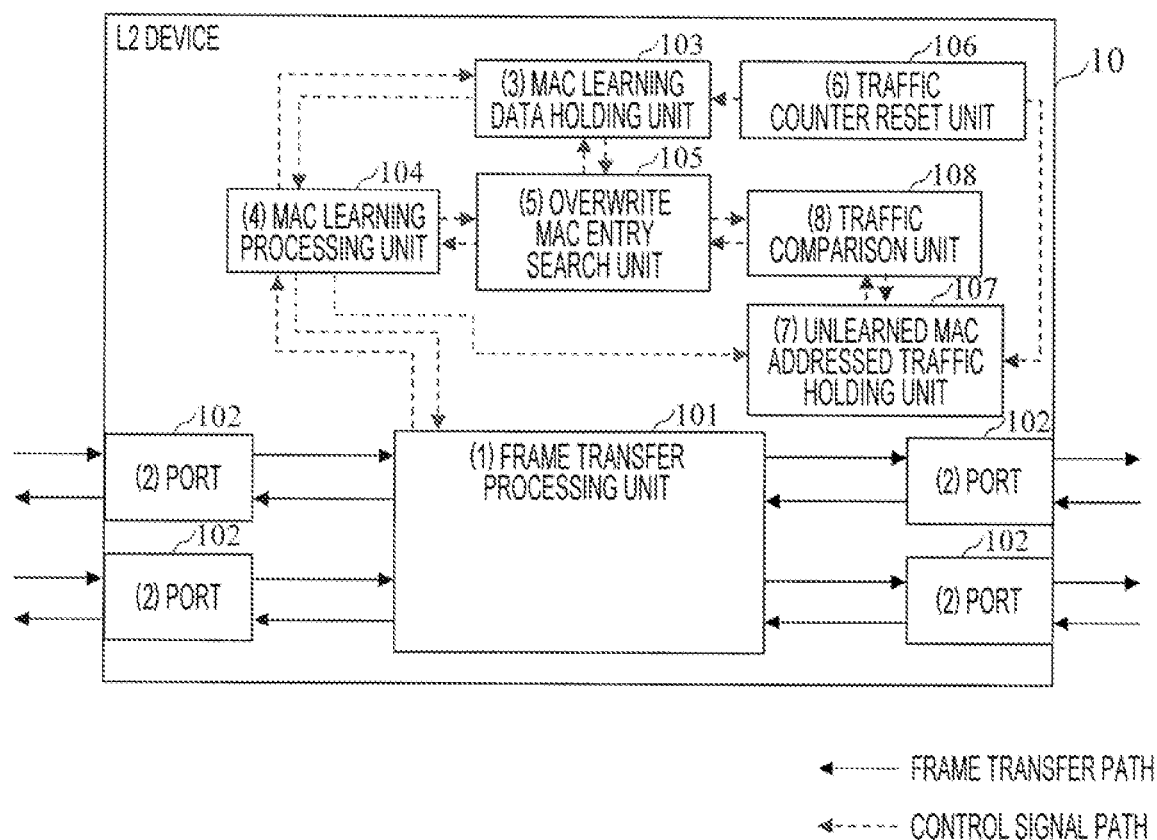
FIG. 6 illustrates a configuration example of an L2 device according to a second embodiment.

FIG. 6 illustrates a configuration example of an L2 device according to the present embodiment. An L2 device 10 according to the present embodiment further includes an unlearned MAC addressed traffic holding unit 107 and a traffic comparison unit 108 and presents increase in a traffic amount.

A traffic counter reset unit 106 according to the present embodiment resets a value of a traffic counter of a MAC learning data holding unit 103 at any interval set to the L2 device 10 in advance and resets a value of a traffic counter of the unlearned MAC addressed traffic holding unit 107.

The unlearned MAC addressed traffic holding unit 107 holds information regarding an unlearned MAC address and the traffic counter.

In response to an inquiry from an overwrite MAC entry search unit 105, the traffic comparison unit 108 compares a traffic amount searched from the unlearned MAC addressed traffic holding unit 107 and a traffic amount of MAC entry information transmitted from the overwrite MAC entry search unit 105 on the basis of information regarding a transmission source MAC address transmitted from a MAC learning processing unit 104 via the overwrite MAC entry search unit 105 and returns a comparison result to the MAC learning processing unit 104 via the overwrite MAC entry search unit 105.

Figure 7:
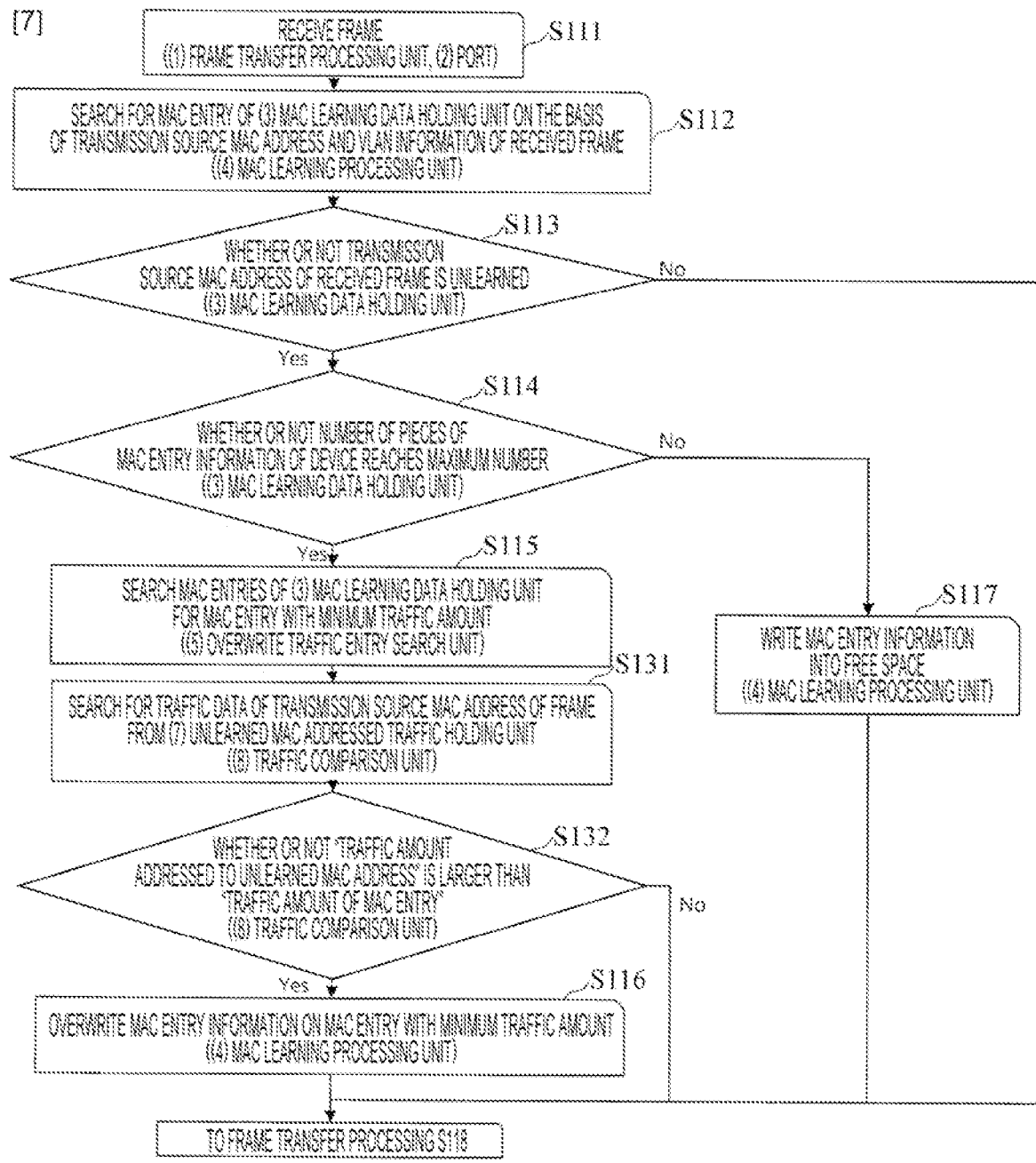
FIG. 7 illustrates an example of frame transfer processing according to the second embodiment.
Figure 8:
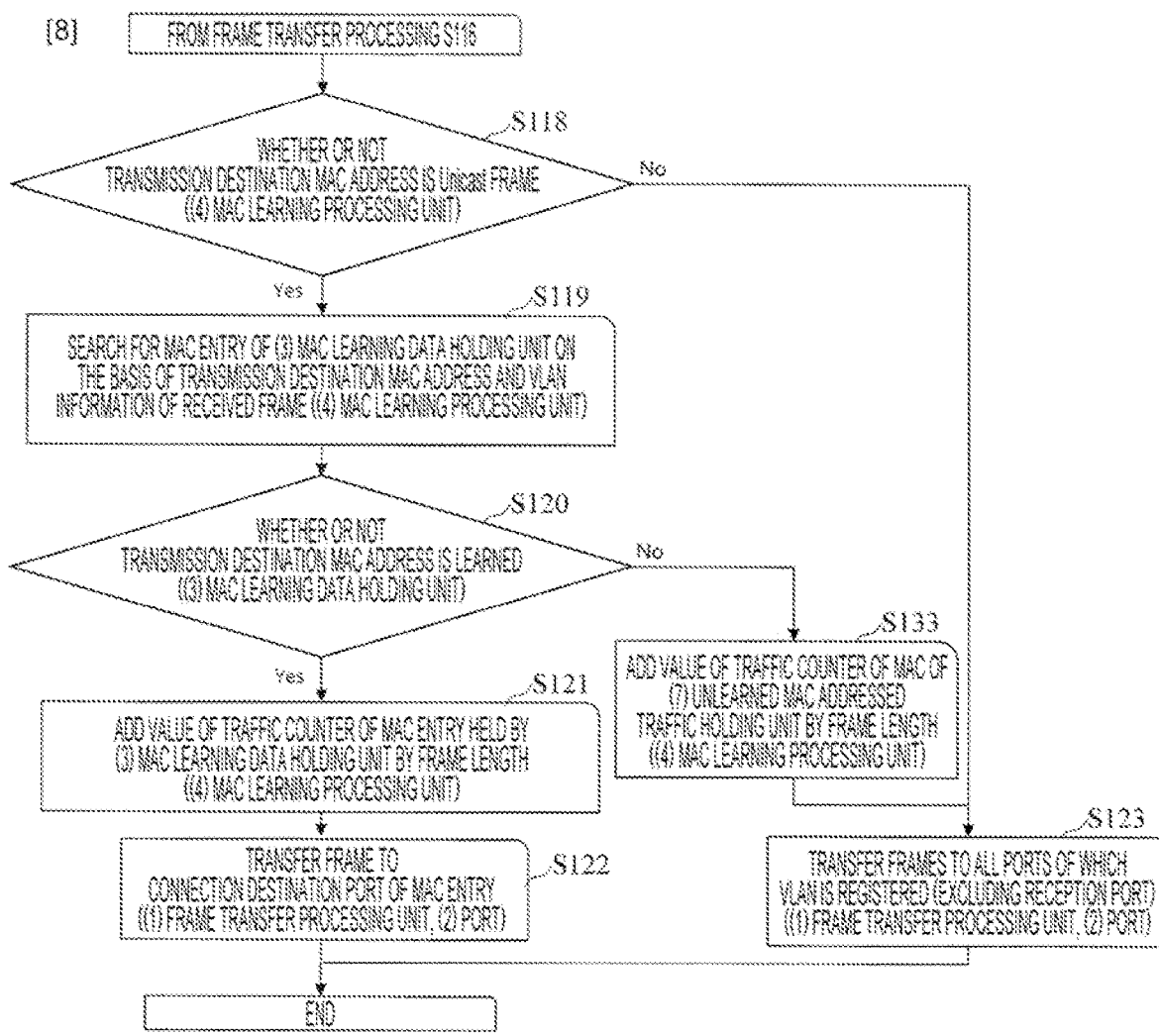
FIG. 8 illustrates an example of the frame transfer processing according to the second embodiment.

FIGS. 7 and 8 illustrate examples of frame transfer processing. In the present embodiment, in a case where the MAC learning data holding unit 103 does not hold and unlearns the transmission source MAC address of the received frame (Yes in S113), the MAC learning processing unit 104 registers the transmission source MAC address and VLAN information of the received frame in the unlearned MAC addressed traffic holding unit 107 as an unlearned new MAC entry. Then, the unlearned MAC addressed traffic holding unit 107 adds the value of the traffic counter of the MAC by a data length of the received frame. As a result, a traffic amount of the received frame is held by the unlearned MAC addressed traffic holding unit 107. This processing can be executed at any timing after step S113 and before step S131.

In the present embodiment, in addition to the frame transfer processing described in the first embodiment, steps S131 and S132 are included between steps S115 and S116.

The traffic comparison unit 108 searches for traffic data of the transmission source MAC address of the frame from the unlearned MAC addressed traffic holding unit 107 (S131) and determines whether or not "a traffic amount addressed to an unlearned MAC address" is larger than "the traffic amount of the MAC entry" (S132).

If "the traffic amount of the MAC entry" is compared with "the traffic amount addressed to the unlearned MAC address" and "the traffic amount addressed to the unlearned MAC address" is larger than "the traffic amount of the MAC entry" (Yes in S132), the MAC learning processing unit 104 overwrites the MAC entry information (S116). On the other hand, if "the traffic amount of the MAC entry" is equal to or larger than "the traffic amount addressed to the unlearned MAC address" (No in S132), the MAC entry is not updated, and the procedure proceeds to step S118.

In a case where the transmission destination MAC address is a Unicast frame (Yes in S118) and the transmission destination MAC address is not learned (No in S120), the MAC learning processing unit 104 registers the transmission destination MAC address and the VLAN information of the received frame in the unlearned MAC addressed traffic holding unit 107. The unlearned MAC addressed traffic holding unit 107 adds the value of the traffic counter of the MAC by a data length of the received frame (S133). As a result, a traffic amount of the received frame is held by the unlearned MAC addressed traffic holding unit 107.

Figure 9:
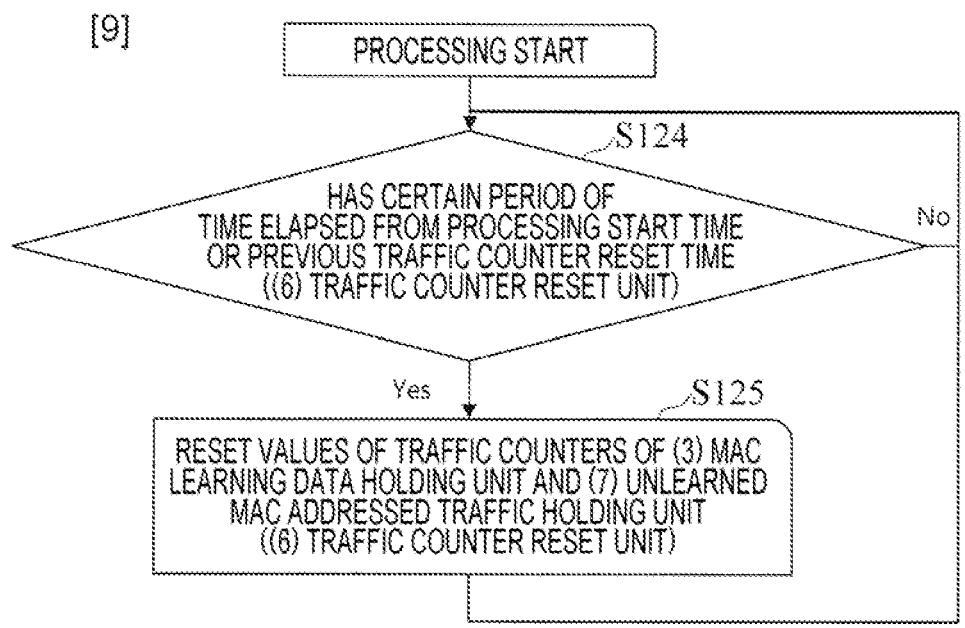
FIG. 9 illustrates an example of reset processing according to the second embodiment.

FIG. 9 illustrates an example of traffic counter reset processing. In the present embodiment, in the traffic counter reset processing according to the first embodiment (S125), a traffic counter of the unlearned MAC addressed traffic holding unit 107 is added as a reset target.

In the present embodiment, by comparing "the traffic amount of the MAC entry" with "the traffic amount addressed to the unlearned MAC address" (S132), it can be presented that the traffic amount caused by the flooding after overwriting than that before overwriting.

Third Embodiment

Figure 10:
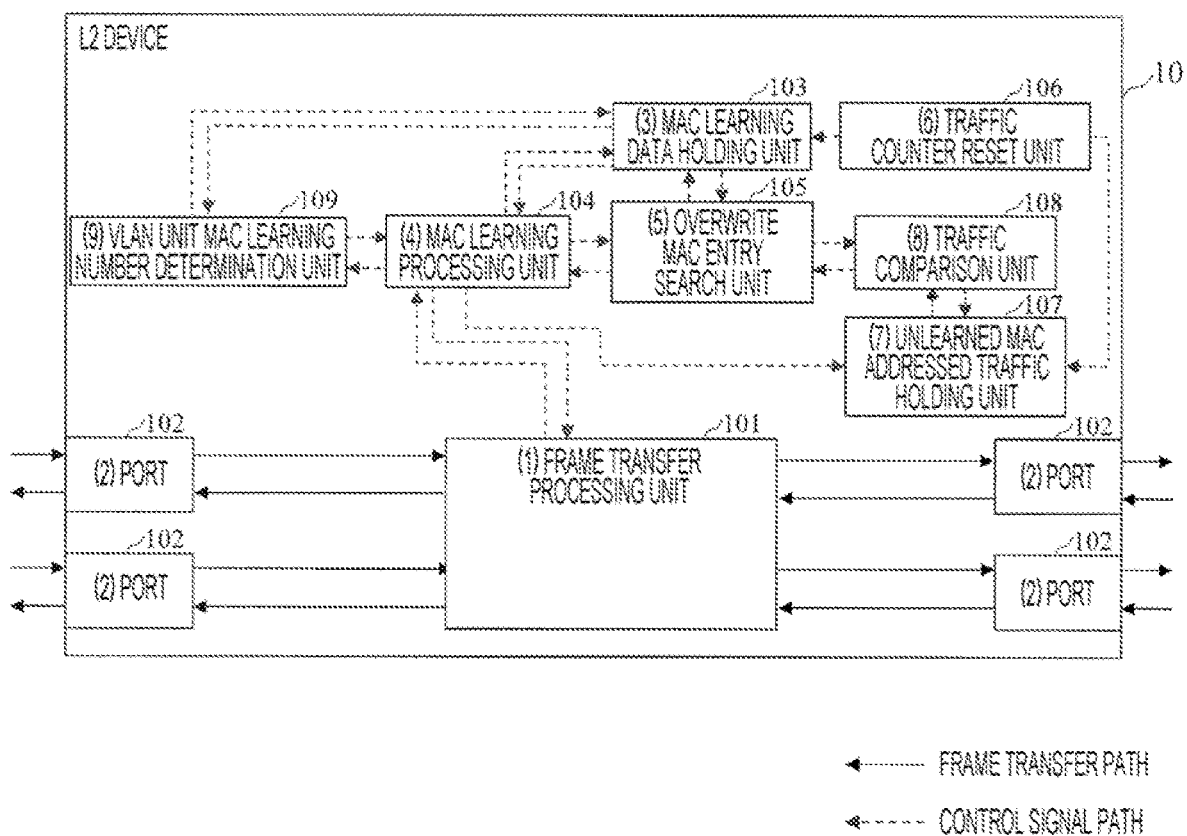
FIG. 10 illustrates a configuration example of an L2 device according to a third embodiment.

FIG. 10 illustrates a configuration example of an L2 device according to the present embodiment. An L2 device 10 according to the present embodiment further includes a VLAN unit MAC learning number determination unit 109 that determines whether or not to reach the number of learned MACs allowed in VLAN unit, in addition to the L2 device 10 according to the second embodiment.

Figure 11:
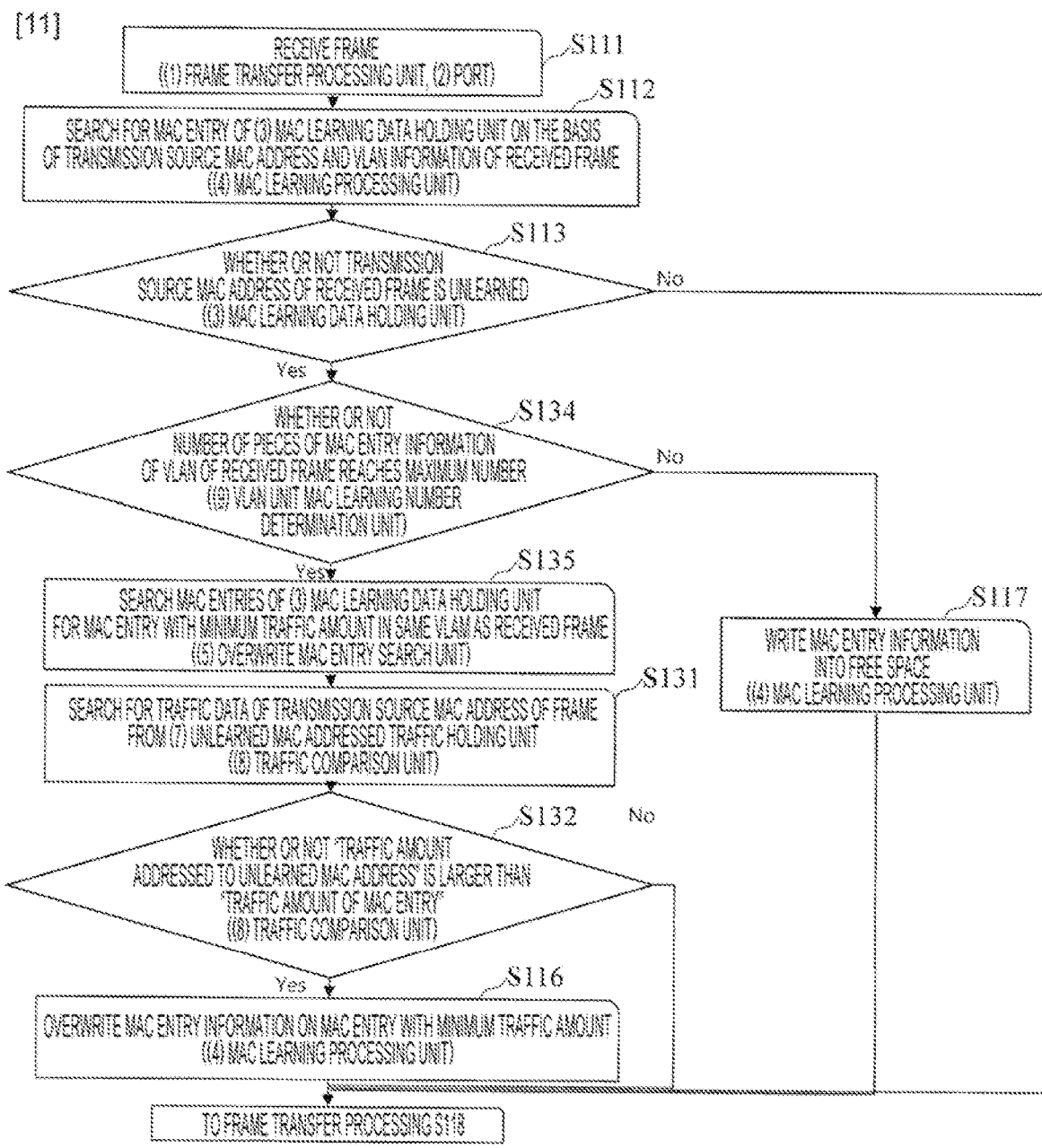
FIG. 11 illustrates an example of frame transfer processing according to the third embodiment.
Figure 12:
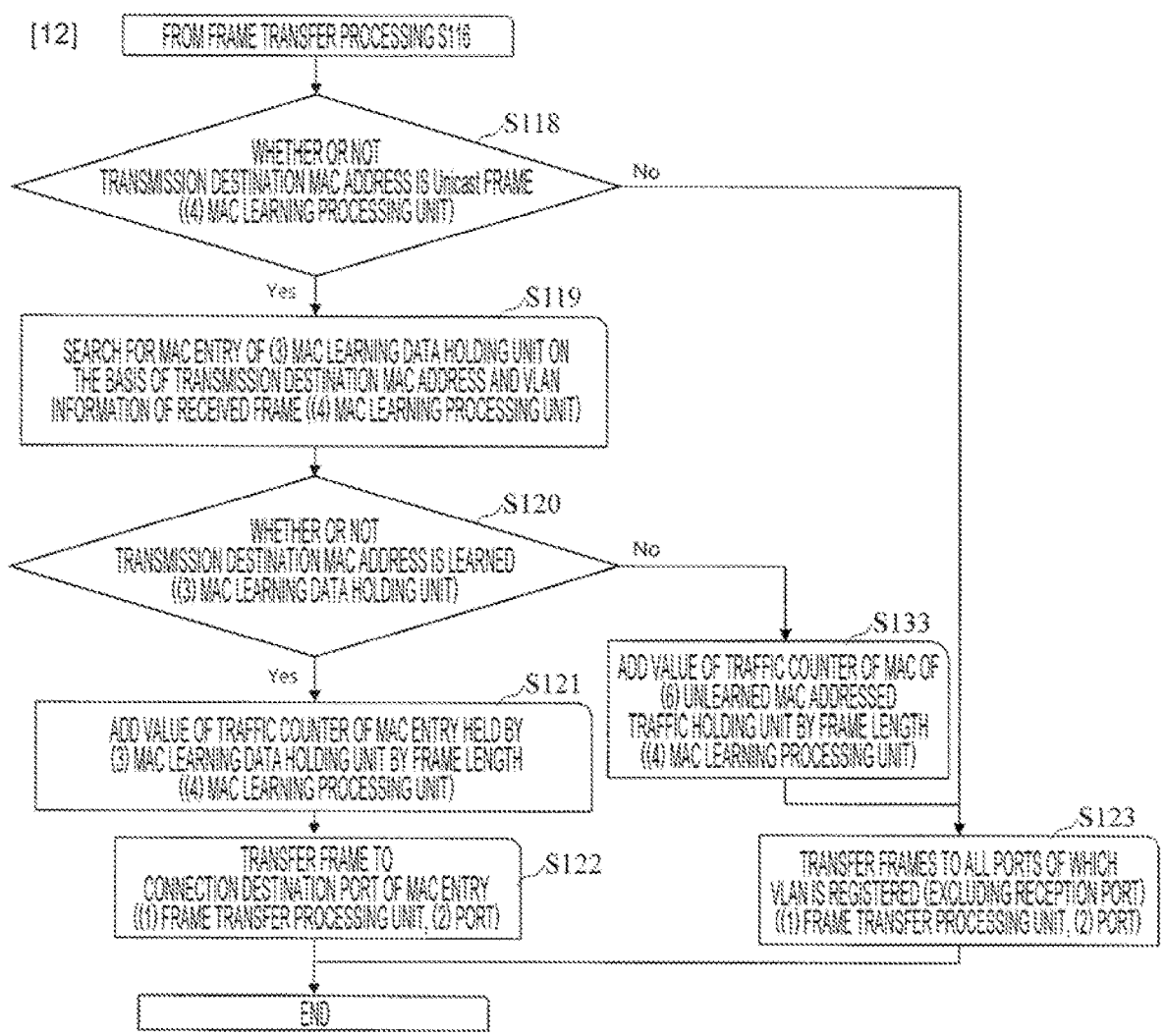
FIG. 12 illustrates an example of the frame transfer processing according to the third embodiment.

FIGS. 11 and 12 illustrate examples of frame transfer processing. In the present embodiment, steps S134 and S135 are included instead of steps S114 and S115 in the frame transfer processing described in the second embodiment.

The VLAN unit MAC learning number determination unit 109 determines whether or not the number of pieces of MAC entry information of a VLAN of a received frame reaches the maximum number (S134). An overwrite MAC entry search unit 105 searches for a MAC entry with the minimum traffic amount from among MAC entries of a MAC learning data holding unit 103 in the same VLAN as the received frame (S135).

In this way, in the present embodiment, it is determined whether or not to overwrite the MAC entry information and executes processing within the number of learned MACs allowed in VLAN unit. In the present embodiment, by extracting the MAC entry information to be overwritten in the same VLAN, it is possible to prevent MAC entry information of other VLAN from being overwritten and flooded.

In the present embodiment, an example has been described in which the L2 device 10 according to the second embodiment further includes the VLAN unit MAC learning number determination unit 109. However, the present disclosure is not limited to this. For example, the L2 device 10 according to the first embodiment may further include the VLAN unit MAC learning number determination unit 109.

Fourth Embodiment

Figure 13:
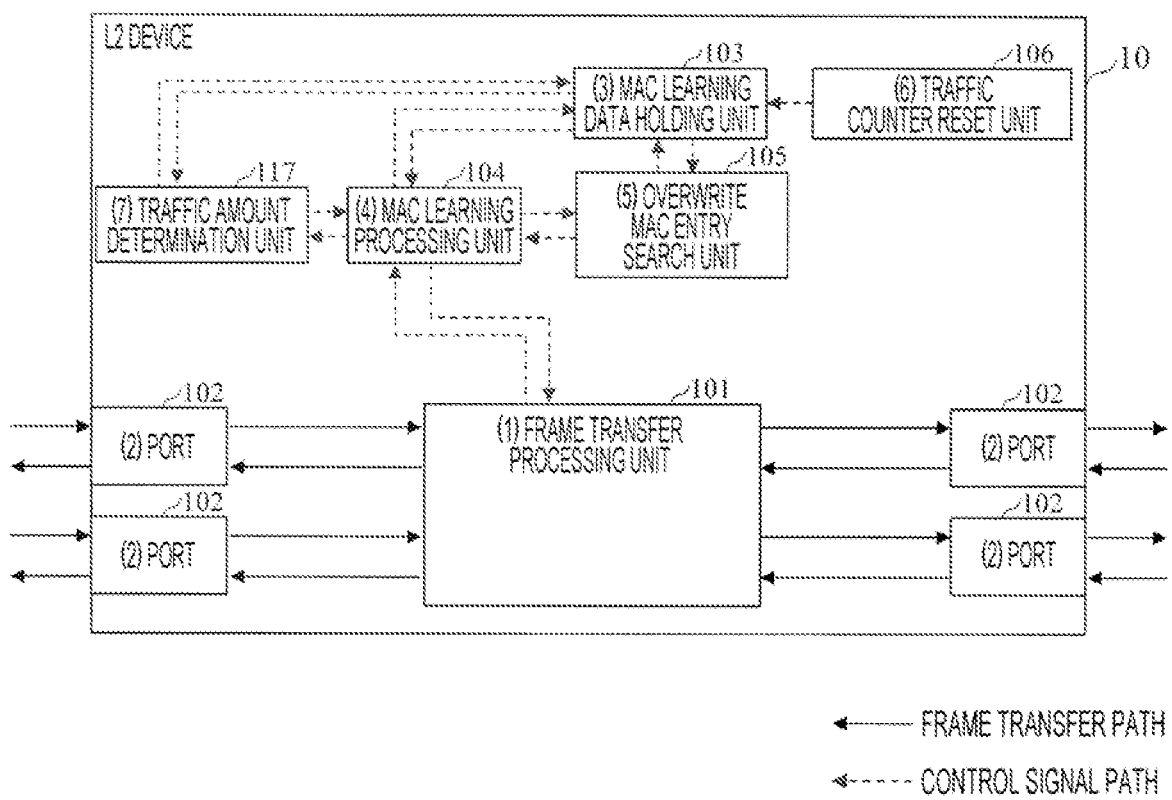
FIG. 13 illustrates a configuration example of an L2 device according to a fourth embodiment.

FIG. 13 illustrates a configuration example of an L2 device according to the present embodiment. An L2 device 10 according to the present embodiment further includes a traffic amount determination unit 117 in addition to the L2 device 10 according to the first embodiment, and narrows MAC entries of which traffic amounts are equal to or less than an arbitrary amount in advance.

A MAC learning data holding unit 103 holds an overwrite target flag in addition to a MAC address, a VLAN, a connection destination port, and a traffic counter.

An overwrite MAC entry search unit 105 compares traffic amounts of MAC entries of which overwrite target MAC entry flags of the MAC learning data holding unit 103 are valid and extracts a MAC entry to be overwritten.

A traffic counter reset unit 106 validates the overwrite target flag in addition to resetting a value of a traffic counter of the MAC learning data holding unit 103 at any interval.

After frame count processing in frame transfer, the traffic amount determination unit 117 confirms the traffic amount of the MAC learning data holding unit 103 on the basis of an arbitrary threshold of a traffic amount (positive number other than zero) set to the L2 device 10 in advance, and in a case where (the threshold of the traffic amount)>(the traffic amount of the MAC entry), the overwrite target flag is changed to be valid.

Figure 14:
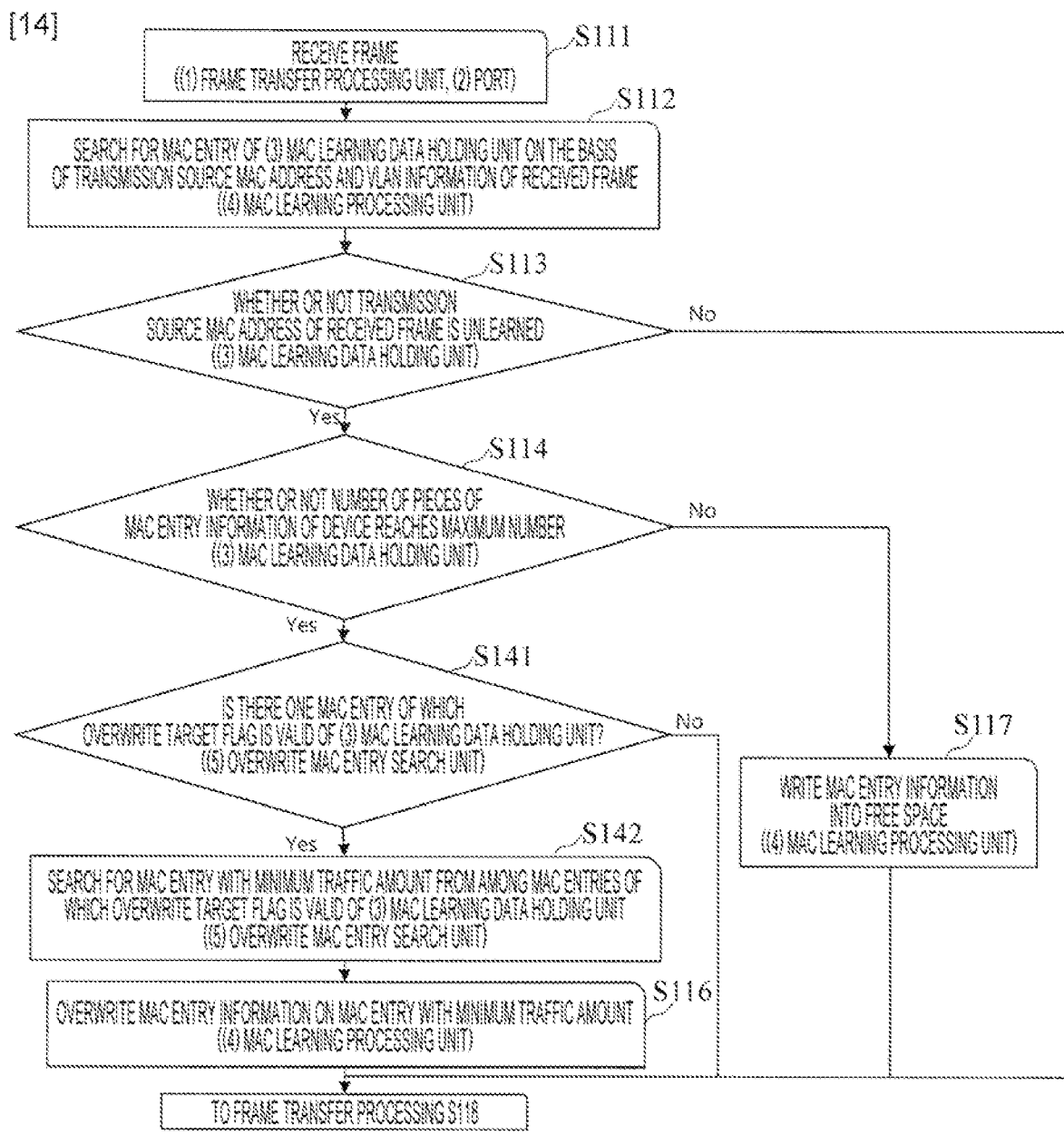
FIG. 14 illustrates an example of frame transfer processing according to the fourth embodiment.
Figure 15:
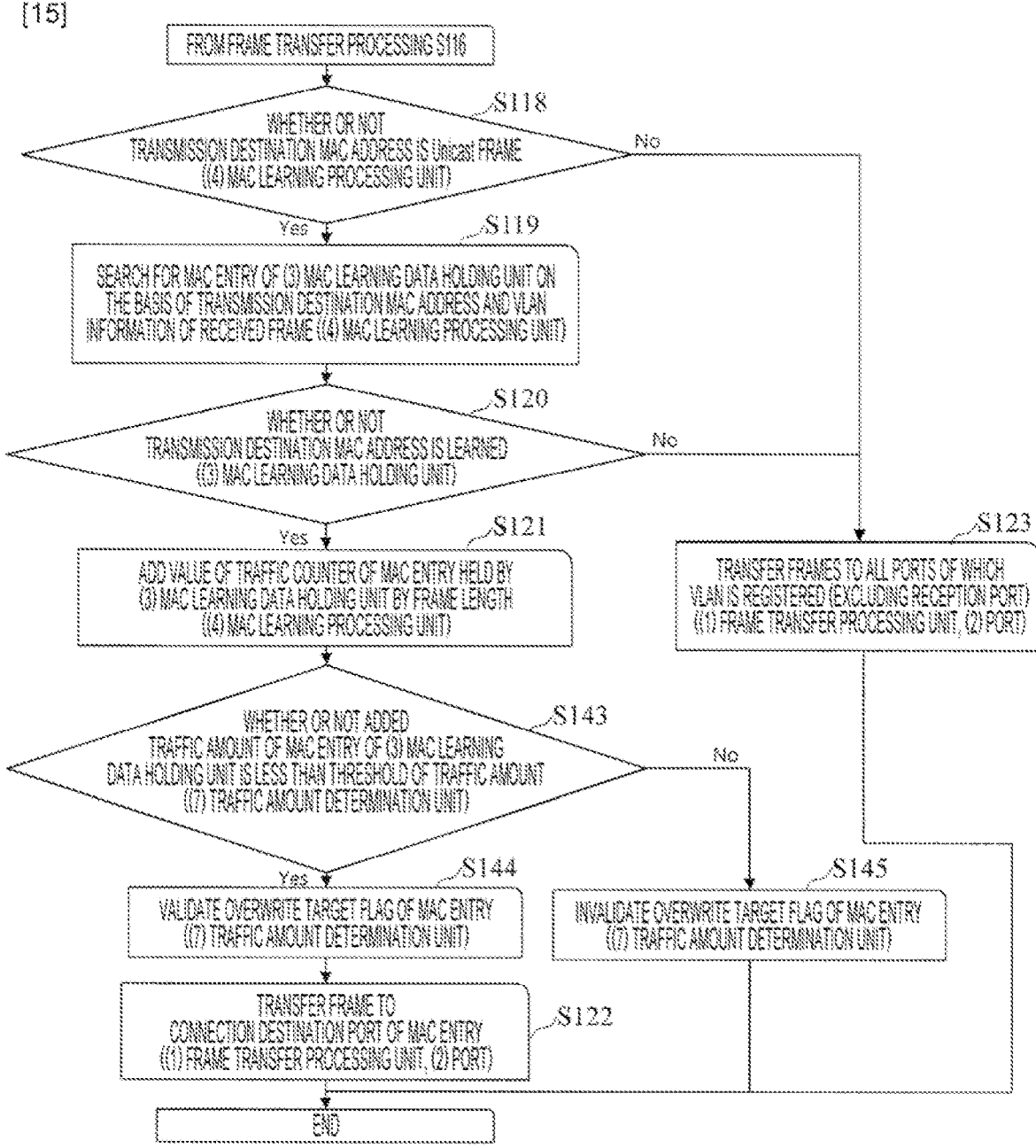
FIG. 15 illustrates an example of the frame transfer processing according to the fourth embodiment.

FIGS. 14 and 15 illustrate examples of frame transfer processing. In the present embodiment, steps S141 and S142 are included instead of step S115 in the frame transfer processing described in the first embodiment, and step S143 is provided between steps S121 and S122 in the frame transfer processing described in the first embodiment.

In the present embodiment, the MAC entry of which the overwrite target flag is valid of the MAC learning data holding unit 103 is set as a target (Yes in S141), and a MAC entry with the minimum traffic amount is searched (S142). Note that, in a case where there is no MAC entry of which the overwrite target flag is valid in the MAC learning data holding unit 103 (No in S141), the MAC entry overwrite processing is not executed.

Timings when the value of the traffic counter for each MAC entry fluctuates are at the time of "(1) frame transmission" and the time of "(2) traffic counter reset". At these two timings, it is determined whether or not to validate or invalidate the overwrite target flag.

At the time of "(1) frame transmission", the traffic counter of the MAC entry is added by a frame length (S121), and it is determined whether or not a traffic amount of the MAC entry after the addition is less than a threshold of an arbitrary traffic amount that is set in advance (S143). If the traffic amount is less than the threshold (Yes in S143), the overwrite target flag is validated (S144), and if the traffic amount is equal to or more than the threshold (No in S143), the overwrite target flag is invalidated (S145).

Figure 16:
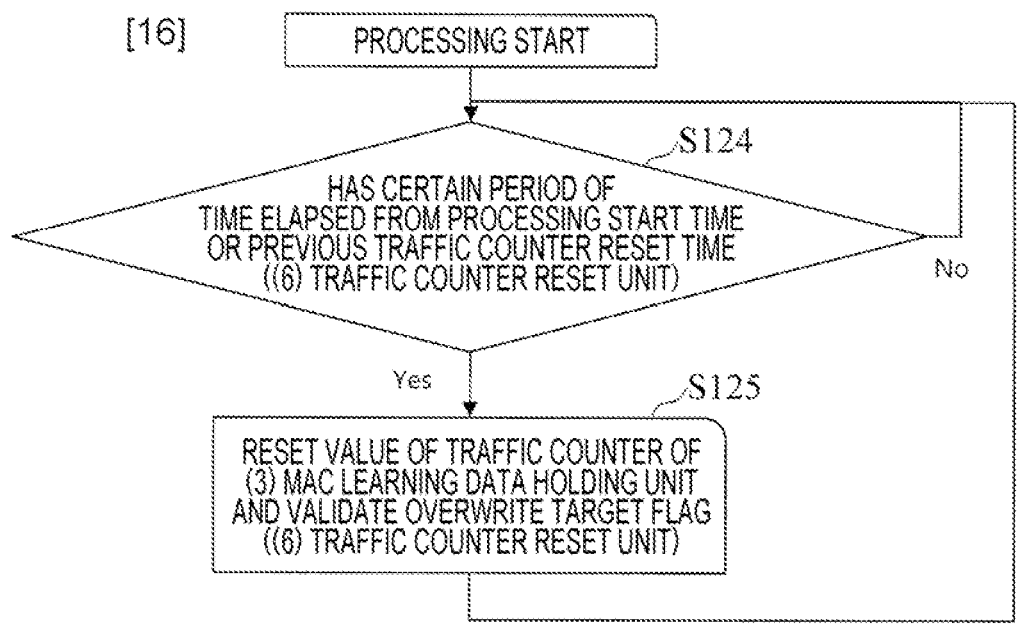
FIG. 16 illustrates an example of reset processing of a traffic counter according to the fourth embodiment.

FIG. 16 illustrates an example of traffic counter reset processing. In the present embodiment, the traffic counter reset unit 106 validates the overwrite target flag (S125) in addition to resetting the value of the traffic counter of the MAC learning data holding unit 103 at an arbitrary interval (S124). By resetting the value of the traffic counter of the MAC learning data holding unit 103, the traffic amount of the MAC learning data holding unit 103 can be less than the threshold of the traffic amount set to the L2 device 10 in advance.

In the present embodiment, by narrowing the MAC entries of which the traffic amount is equal to or less than an arbitrary amount in advance, the processing for searching for the MAC entry to be overwritten can be reduced.

In the present embodiment, an example has been described where the MAC learning data holding unit 103, the overwrite MAC entry search unit 105, the traffic counter reset unit 106, and the traffic amount determination unit 117 are included in the L2 device 10 according to the first embodiment. However, the present disclosure is not limited to this. For example, these functional units may be included in the L2 device 10 according to the second or third embodiment.

Fifth Embodiment

Figure 17:
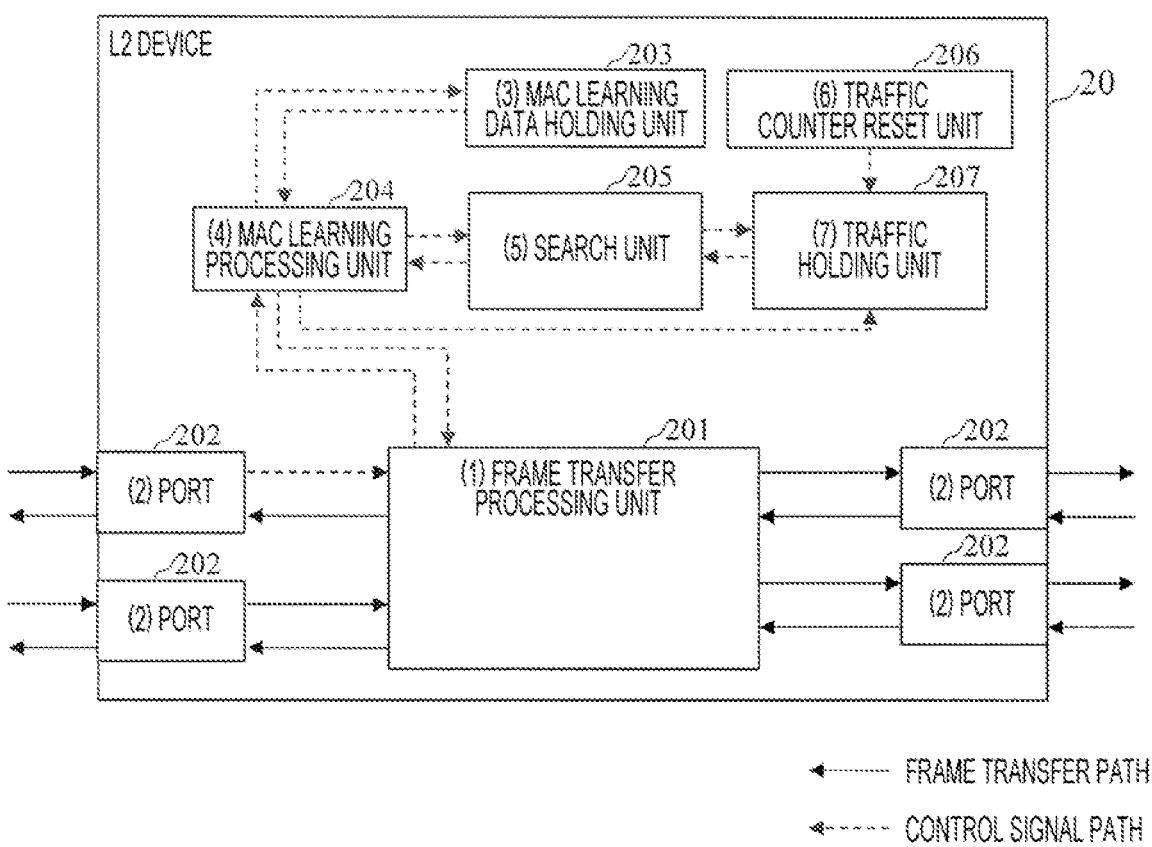
FIG. 17 illustrates a configuration example of an L2 device according to a fifth embodiment.

FIG. 17 illustrates a configuration example of an L2 device according to the present embodiment. An L2 device 20 according to the present embodiment includes a frame transfer processing unit 201, a port 202, a MAC learning data holding unit 203, a MAC learning processing unit 204, a search unit 205, a traffic counter reset unit 206, and a traffic holding unit 207.

The frame transfer processing unit 201 executes processing for transferring a received frame.

The port 202 receives a frame from the adjacent L2 device and transmits the frame to the frame transfer processing unit 201. Furthermore, the port 202 transfers the frame received from the frame transfer processing unit 201 to an adjacent L2 device.

The MAC learning data holding unit 203 holds MAC entry information including a MAC address, a connection destination port, and any determination data (VLAN or the like).

The MAC learning processing unit 204 searches for a transmission source MAC address of the frame received by the frame transfer processing unit 201 and information regarding the determination data from the MAC learning data holding unit 203. In a case where there is no MAC entry information and the number of pieces of MAC entry information held by the MAC learning data holding unit 203 does not reach the maximum number, the MAC learning processing unit 204 writes the information regarding the MAC address, the determination data, and the connection destination port in a free space of the MAC learning data holding unit 203. In a case where there is no MAC entry information and the number of pieces of MAC entry information held by the MAC learning data holding unit 203 reaches the maximum number, the MAC learning processing unit 204 makes an inquiry to the search unit 205 and overwrites the information on a MAC entry having the value of the determination data specified by the search unit 205.

Moreover, the MAC learning processing unit 204 searches for the MAC entry information of the MAC learning data holding unit 203 on the basis of the transmission destination MAC address of the frame received by the frame transfer processing unit 201 and the information regarding the determination data. At that time, the MAC learning processing unit 204 adds a data length of the frame to the traffic counter of the determination data held by the traffic holding unit 207 and returns the information regarding the connection destination port to the frame transfer processing unit 201.

In response to the inquiry from the MAC learning processing unit 204, the search unit 205 searches for determination data with the minimum traffic amount on the basis of the information in the traffic holding unit 207 and returns the searched information regarding the determination data to the MAC learning processing unit 204.

The traffic counter reset unit 206 resets the value of the traffic counter of the traffic holding unit 207 at any interval set by the L2 device 20 in advance.

The traffic holding unit 207 holds traffic information in determination data unit.

Figure 18:
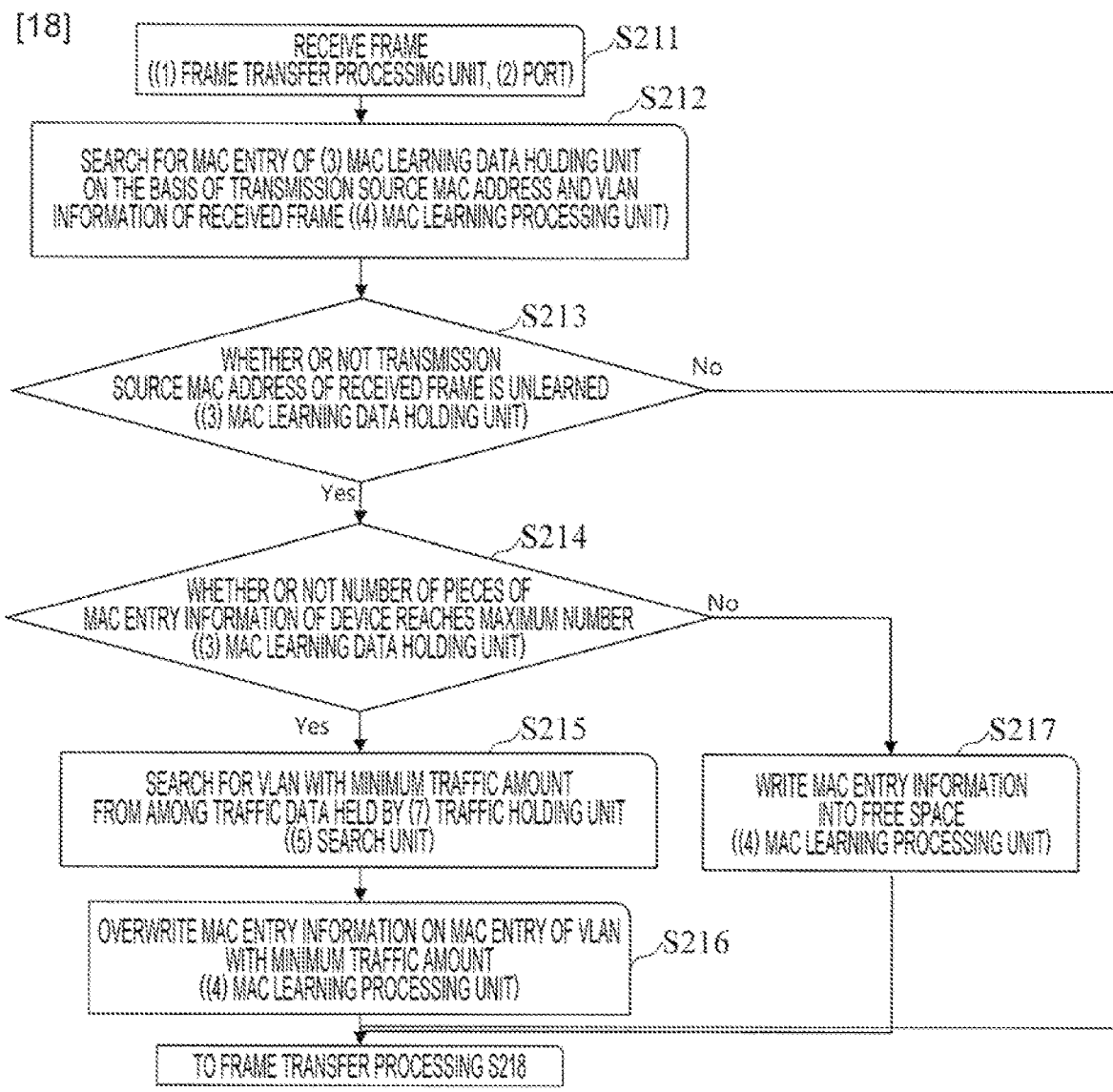
FIG. 18 illustrates an example of frame transfer processing according to the fifth embodiment.
Figure 19:
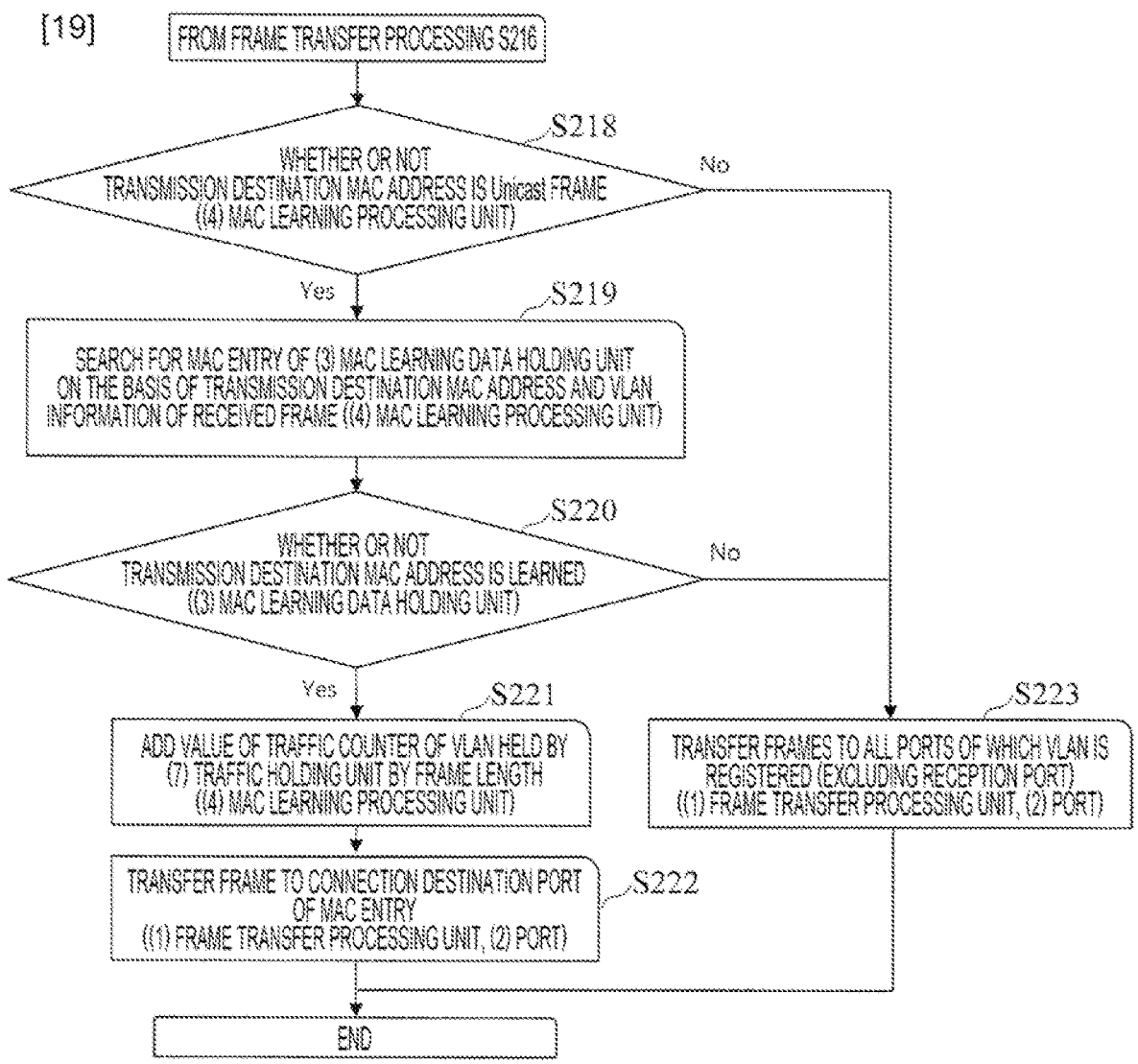
FIG. 19 illustrates an example of the frame transfer processing according to the fifth embodiment.

FIGS. 18 and 19 illustrate examples of frame transfer processing.

When receiving a frame (S211), the MAC learning processing unit 204 searches for a MAC entry of the MAC learning data holding unit 203 on the basis of the transmission source MAC address and the VLAN information of the received frame (S212). The MAC learning data holding unit 203 determines whether or not the transmission source MAC address of the received frame is unlearned (S213). In a case where the transmission source MAC address of the received frame is unlearned (Yes in S213), the MAC learning data holding unit 203 determines whether or not the number of pieces of MAC entry information of the device reaches the maximum number (S214).

In a case where the transmission source MAC address of the received frame is unlearned (Yes in S213) and the number of pieces of MAC entry information of the device reaches the maximum number (Yes in S214), the search unit 205 searches traffic data held by the traffic holding unit 207 for a VLAN with the minimum traffic amount (S215) and overwrites MAC entry information on a MAC entry that is randomly selected from among the MAC entries of the VLAN with the minimum traffic amount (S216).

In a case where the transmission source MAC address of the received frame is unlearned (Yes in S213) and the number of pieces of MAC entry information of the device does not reach the maximum number (No in S214), the MAC learning processing unit 204 writes the MAC entry information into a free space (S217).

In a case where the transmission source MAC address of the received frame is learned (No in S213) or after steps S216 and S217, the MAC learning processing unit 204 determines whether or not the transmission destination MAC address is a Unicast frame (S218). In a case where the transmission destination MAC address is the Unicast frame, the MAC learning processing unit 204 searches for the MAC entry of the MAC learning data holding unit 203 on the basis of the transmission destination MAC address and the VLAN information of the received frame (S219).

The MAC learning data holding unit 203 determines whether or not the transmission destination MAC address is learned (S220). In a case where the transmission destination MAC address of the received frame is the Unicast frame and MAC-learned, the MAC learning processing unit 204 adds the value of the traffic counter of the VLAN by a frame length (S221). The frame transfer processing unit 201 and the port 202 transfer the frame to the connection destination port of the MAC entry (S222).

In a case where the transmission destination MAC address is not the Unicast frame (No in S218) or the transmission destination MAC address is unlearned in step S220 (No in S220), the frame transfer processing unit 201 and the port 202 transfer the frames to all ports of which the VLAN is registered (excluding reception port) (S223).

Figure 20:
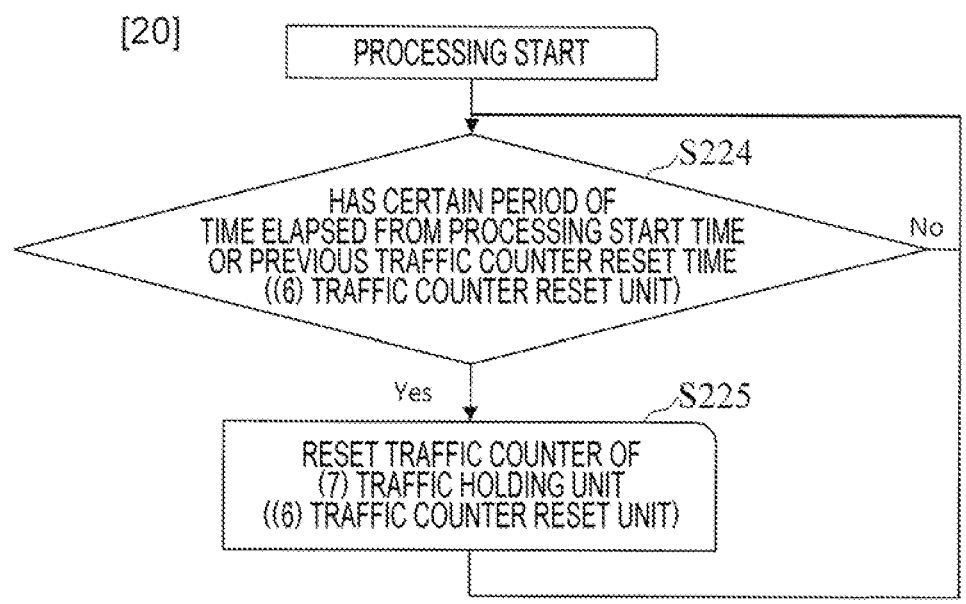
FIG. 20 illustrates an example of reset processing of a traffic counter according to the fifth embodiment.
Figure 21:
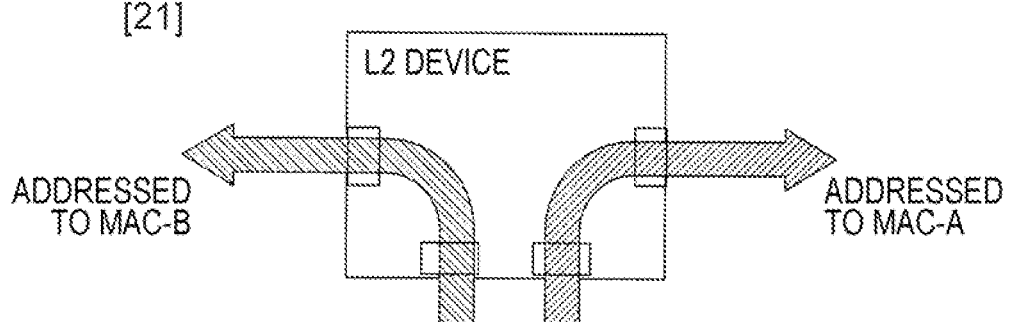
FIG. 21 is a diagram for explaining a problem of the present disclosure.
Figure 21:
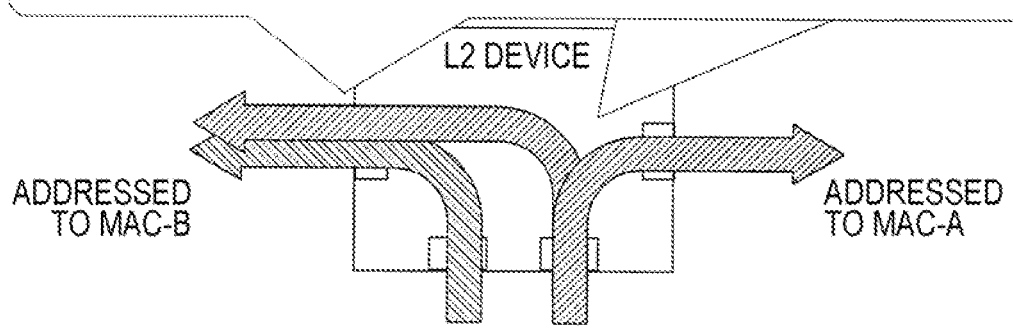

FIG. 20 illustrates an example of reset processing of a traffic counter. In a case where a certain period of time has elapsed from a start time of the traffic counter reset processing or a previous traffic counter reset time (Yes in S224), a value of the traffic counter in VLAN unit is reset (S225). As a result, the value of the traffic counter in the VLAN unit represents a traffic amount flowed in a preset certain period of time.

In the present embodiment, in the target L2 device 20, by performing overwrite on the MAC entry of the VLAN with a relatively small traffic amount (S216), it is possible to reduce an effect on a band caused by flooding of the frame addressed to the overwritten MAC address. Furthermore, by observing a traffic in VLAN unit (S215), processing for observing the traffic is reduced, and in addition, the MAC entry to be overwritten is extracted in VLAN unit (S212) so as to reduce processing for extracting an overwrite target.

Therefore, in the present embodiment, even if the frame addressed to the original (overwritten) MAC is received again after the MAC address is overwritten, the traffic amount to be flooded is small, and accordingly, it is possible to reduce band compression.

Note that the L2 devices 10 and 20 according to the present disclosure described above can be implemented by a computer and a program, and the program can be recorded in a recording medium or can be provided through a network.

INDUSTRIAL APPLICABILITY

The present disclosure can be applied to the information communication industry.

REFERENCE SIGNS LIST 10, 20: L2 device
101, 201: frame transfer processing unit
102, 202: port
103, 203: MAC learning data holding unit
104, 204: MAC learning processing unit
105: overwrite MAC entry search unit
106, 206: traffic counter reset unit
107: unlearned MAC addressed traffic holding unit
108: traffic comparison unit
109: VLAN unit MAC learning number determination unit
117: traffic amount determination unit
205: search unit
207: traffic holding unit

The invention claimed is:

1. A communication device that
measures a traffic amount in any predetermined determination data unit,
holds MAC entry information including the measured traffic amount and a media access control address (MAC address) in a MAC learning data holding unit, and
in response to a number of pieces of MAC entry information held by the MAC learning data holding unit exceeds a limit:
searches for minimum MAC entry information with a minimum traffic amount from among traffic data amounts in determination data unit held by the MAC learning data holding unit, and
overwrites the minimum MAC entry information obtained by search with unlearned MAC entry information that is not held by the MAC learning data holding unit.

2. The communication device according to claim 1, wherein the communication device:
measures a traffic amount for each MAC entry,
holds the traffic amount for each MAC entry in the MAC learning data holding unit,
searches for minimum MAC entry information with the minimum traffic amount from among traffic data amounts of respective MAC entries held by the MAC learning data holding unit, and
overwrites the minimum MAC entry information obtained by search with the unlearned MAC entry information.

3. The communication device according to claim 2, wherein the communication device:
measures a traffic amount of an unlearned MAC address that is not held by the MAC learning data holding unit,
compares the traffic amount of the minimum MAC entry information with the traffic amount of the unlearned MAC address, and
in a case where the traffic amount of the minimum MAC entry information is less than the traffic amount of the unlearned MAC address, overwrites the minimum MAC entry information with the MAC entry information of the unlearned MAC address.

4. The communication device according to claim 1, wherein
the communication device measures a traffic amount for each virtual LAN (VLAN),
the MAC learning data holding unit holds the traffic amount for each VLAN,
minimum MAC entry information with the VLAN same as the unlearned MAC entry information and the minimum traffic amount is searched from among traffic data amounts of respective MAC entries held by the MAC learning data holding unit, and
the minimum MAC entry information obtained by search is overwritten with the unlearned MAC entry information.

5. The communication device according to claim 1, wherein the MAC learning data holding unit holds a flag in association with a MAC entry of which a traffic amount is equal to or less than a predetermined traffic amount.

6. The communication device according to claim 1, wherein
the traffic amount held by the MAC learning data holding unit is reset at any time interval.

7. A non-transitory computer-readable medium having computer-executable instructions that, upon execution of the instructions by a processor of a computer, cause the computer to function as the device according to claim 1.

8. An address learning method performed by a communication device, comprising:
measuring a traffic amount in any predetermined determination data unit;
holding MAC entry information including the measured traffic amount and a MAC address in a MAC learning data holding unit; and
in response to a number of pieces of MAC entry information held by the MAC learning data holding unit exceeds a limit:
searching for minimum MAC entry information with a minimum traffic amount from among traffic data amounts in determination data unit held by the MAC learning data holding unit; and
overwriting the minimum MAC entry information obtained by search with unlearned MAC entry information that is not held by the MAC learning data holding unit.

9. The method of claim 8 further comprises
measuring a traffic amount for each MAC entry,
holding the traffic amount for each MAC entry in the MAC learning data holding unit,
searching for minimum MAC entry information with the minimum traffic amount from among traffic data amounts of respective MAC entries held by the MAC learning data holding unit, and
overwriting the minimum MAC entry information obtained by search with the unlearned MAC entry information.

10. The method of claim 8 further comprises
measuring a traffic amount for each virtual LAN (VLAN),
the MAC learning data holding unit holds the traffic amount for each VLAN,
minimum MAC entry information with the VLAN same as the unlearned MAC entry information and the minimum traffic amount is searched from among traffic data amounts of respective MAC entries held by the MAC learning data holding unit, and the minimum MAC entry information obtained by search is overwritten with the unlearned MAC entry information.

11. The method of claim 8 further comprises measuring a traffic amount of an unlearned MAC address that is not held by the MAC learning data holding unit, compares the traffic amount of the minimum MAC entry information with the traffic amount of the unlearned MAC address, and in a case where the traffic amount of the minimum MAC entry information is less than the traffic amount of the unlearned MAC address, overwrites the minimum MAC entry information with the MAC entry information of the unlearned MAC address.

\* \* \* \* \*